United States Patent [19]

Oncken

[11] Patent Number: 4,985,833
[45] Date of Patent: Jan. 15, 1991

[54] EXTENDED COVERAGE MONETARY REGULATION SYSTEM

[75] Inventor: John E. Oncken, Austin, Tex.

[73] Assignee: First City, Texas- N. A., Austin, Tex.

[21] Appl. No.: 520,837

[22] Filed: May 7, 1990

Related U.S. Application Data

[63] Continuation-in-part of Ser. No. 235,490, Aug. 24, 1988, abandoned.

[51] Int. Cl.$^5$ ............................................. G06F 15/21
[52] U.S. Cl. ...................................... 364/408; 364/401
[58] Field of Search ................................. 364/401, 408

[56] References Cited

U.S. PATENT DOCUMENTS

4,346,442 8/1982 Musmanno ........................... 364/408
4,774,663 9/1988 Musmanno et al. ................. 364/408

Primary Examiner—Jerry Smith
Assistant Examiner—David Huntley
Attorney, Agent, or Firm—John N. Shaffer, Jr.

[57] ABSTRACT

An extended coverage monetary regulation system for automatically distributing customer deposits to multiple financial institutions so as to obtain F.D.I.C. or F.S.L.I.C. coverage for the full amount of the deposits regardless of the amount. The system of the present invention enables depositors to deal with a single financial institution regardless of the amount of funds deposited and still obtain federal insurance for their funds. Further, the invention provides immediate access to these funds and unlimited withdrawals. A central transaction control center monitors deposits and assigns them, in co-mingled form, to institutions not excluded by the terms of the agreement between the depositor and the control center. The depository institutions receive the funds in co-mingled form and handle them in lump sum. Because the control center maintains accurate records of the identity and the amounts of funds distributed to selected insured depositories, the depositors funds can be divided among depositories so as to obtain full insurance coverage. Further, the depositories have no need to know, and are unaware of, the identity of the individual depositors. When one less than the maximum number of withdrawals have been made from any selected depository during a month's time, the central transaction control center withdraws the entire sum and distributes it through other selected insured depositories that have the capacity for more than one withdrawal during the remainder of the month.

14 Claims, 5 Drawing Sheets

EXTENDED COVERAGE MONETARY REGULATION SYSTEM

This application is a continuation-in-part of application Ser. No. 07/235,490, filed Aug. 24, 1988 now abandoned.

BACKGROUND OF THE INVENTION

This invention relates to an extended coverage monetary regulation system.

Both manual and automatically operated devices have been known in the art for quite some time that are utilized for the protection and regulation of monetary exchanges. The banking crisis of the 1930's, for instance, led to the creation of the Federal Deposit Insurance Corporation (F.D.I.C.) and the Federal Savings and Loan Insurance Corporation (F.S.L.I.C.) to protect depositors in banks and savings and loan institutions from loss in the event an institution failed. Presently, each qualifying institution pays premiums to the federal insuring entity to provide the insurance for their depositors. The level of insurance for each depositor has grown steadily over the years to the present level of $100,000 each.

Individual depositors, with exceptionally large amounts to deposit, have required financial institutions to provide details of the specific insurance protection offered by the applicable federal insurance entity in order to find ways to insure more than $100,000 at their chosen institution. The regulations defining insurance coverage provide for separate coverage for individual depositors, joint depositors, and funds held in trust. As a result, by carefully structuring the titles and ownership records of depositors' accounts, financial institutions in the past have been able to provide some additional insurance protection beyond the $100,000 limit in order to satisfy the needs of most of its depositors.

Nonetheless, commercial business depositors frequently have deposit balances in excess of the insured limits and must identify an institution that is "safe" (financially secure) by careful monitoring of public information provided by their institution or by spreading their deposits into multiple insured institutions to keep the level of their deposits below insured limits. Frequently, businesses have chosen to bank with large financial institutions because they seem to be the strongest and it is an accounting burden to distribute deposits in increments of $100,000 or less.

Public deposits of federal, state, or municipal entities must be federally insured or "collateralized" by having financial institutions pledge investment securities (normally U.S. Treasury, U.S. Agency, or municipal bonds) to secure public deposits in the event of institution failure. The $100,000 insurance limit is frequently substantially below the deposit levels of public entities.

Since the mid 1980's, economic conditions have put substantial pressures on financial institutions involved in lending to (1) lesser developed countries, (2) agricultural interests, (3) energy concerns, and (4) real estate developers. They have all suffered losses that put pressure on their financial base. The rate of financial institution failure has escalated rapidly. The problem of bank and S & L failures has been especially prominent in the Southwestern United States.

As the general public has became more aware of the weakened condition of many financial institutions, depositors began to withdraw deposits in excess of insured limits and redeposit them with other separately insured institutions. The loss of funding by the affected institutions placed even more pressure on their ability to survive. New programs were needed to provide the funding necessary to continue to operate. The prior art includes several types of programs that were developed and installed by numerous financial institutions, such as:

1. Insured Certificates of Deposit

Bank holding companies that owned multiple federally insured financial institutions began to offer their depositors the opportunity to place funds through one of their institutions (or another subsidiary of the holding company) and have the funds deposited in separate certificates of deposit at each of the banks owned by the company. Each of the depository banks issued certificates of deposit for each customer's deposit and the holding company (or designated subsidiary) issued a safekeeping receipt to the customer for their total deposit. If a holding company owned 25 banks, it could offer depositors $2,500,000 in federally insured time deposits.

Limitations:
1. Individual banks and S & Ls cannot use this approach. (Individual banks have no affiliates to which to spread deposits and S & Ls are normally operating as a single insured entity with multiple branches.)
2. Maximum insured deposit amount limited by the number of insured institutions in a holding company.
3. Significant increase in accounting and record keeping requiring (a) each participating institution to maintain a detailed record of each customer's deposit and interest earnings at their institution and (b) the holding company to prepare consolidated reports for the customer.
4. Depositors must commit funds for a minimum of seven (7) days (regulatory minimum term of a CD), but commonly the minimum term is established at thirty (30) days or more due to the burdensome record keeping requirements. Some institutions establish minimum terms of as long as 18 months.
5. Interest rate is fixed for the term of the certificate of deposit.
6. Penalties may be assessed for early withdrawal.

2. Brokered Deposits

Some financial institutions turn to financial brokers to obtain additional time deposits. The broker "sells" the time deposits of the institution to investors across the country, usually in deposit amounts less than $100,000 each to provide deposit insurance for the individual investors. The financial institution must agree to pay "market rates" that frequently are higher than the financial institution's local market. In addition, the financial institution must pay the broker a fee, usually based upon the amount and term of acquired deposits. The broker may have all certificates in the broker's name and be responsible for maintaining the deposit records of each individual investor.

Limitations:
1. Deposits are of a temporary nature and will be relocated based entirely on rate.
2. Interest cost is higher than market.
3. Special governmental reporting is required by financial institutions if brokered deposits exceed established limits.

4. Depositor (investor) must deal with a broker rather than a familiar financial institution.
5. Many depositors are not contacted by brokers and are not aware that they can obtain higher rates on insured deposits.
6. Deposits must normally be placed for a term of from 30 days to 1 year.
7. Interest rate is fixed for the term of the deposit.
8. Penalties for early withdrawal usually apply.

3. Premium Promotions

The most common method of attracting new deposits is to pay interest rates above market or to offer some type of special premium gift in addition to the payment of interest. Since deregulation of interest rates, the promotions are limited only by the imagination of the advertising agency developing a deposit program and by the budget of the financial institution. Regulations do require full disclosure of any special terms or penalties for early withdrawal.

Limitations:
1. Insurance limits may restrict the size of any new deposits.
2. Interest costs are above market.
3. Promotional costs can be significant.
4. Competition may match promotion rates and increase rates in general in the local market.

Drawbacks to the monetary regulation methods, known in the prior art, continue. Thus, there is a need in the art for providing an extended coverage monetary regulation system for providing customers the safety of federally insured deposits without requiring the customer to seek multiple depositories or financial brokers. It, therefore, is an object of this invention to provide an extended coverage monetary regulation system that provides the following advantages to depositors, managing depositories, and depository institutions.

1. Depositor Perspective

1. Unlimited insured deposit capability through a single managing financial institution.
2. Funds available for immediate withdrawal without penalty.
3. Variable interest rate that is market competitive.
4. Full consolidated accounting of all funds on deposit on a monthly basis from one institution.
5. No direct service charge or fee for the service.

2. Managing Depository Perspective

1. Ability to offer fully insured deposit opportunities to customers well in excess of standard insured limits.
2. Customer records easily maintained.
3. Cost of funds retained on deposit in the managing institution are at competitive market rates.
4. Ability to profit from deposits distributed to other financial institutions in order to obtain additional federal insurance for the customer.
5. Ability to restrict identity of depositor from other depository institutions.
6. Customer's access to deposited funds can only be obtained through the managing financial institution.
7. Ability to accept funds from individual, business, and public depositors.

3. Depository Institution Perspective

1. Funds available at competitive market rates.
2. Minimal record keeping requirements.
3. Limited transaction volume.

SHORT STATEMENT OF THE INVENTION

Accordingly, the extended coverage monetary regulation system of the present invention includes the establishment of a central transaction control center for receipt, disbursement, and insurance of any number of individual account funds in unlimited amounts. The central transaction control center, the managing financial institution, processes individual account funds so that selected insured financial institutions receive co-mingled funds in lump sum. Processing further ensures that each selected financial institution receives less than a maximum amount of each separate account funds. Further, the central transaction control center monitors each of the individual account funds so that, upon receipt of a deposit at the central control center, the deposit received by selected financial institutions, after deposit, is still maintained at less than a maximum amount for each of the individual account funds. Still further, each of the selected financial institutions is monitored so that as a total number of withdrawals from each of the selected financial institutions, of the co-mingled individual account funds, reaches one less than a maximum number, one final withdrawal is made reducing the balance of the individual account funds at that particular selected financial institution to zero. Thereafter, these funds are transferred to a selected financial institution or institutions with more than one less than the maximum number of withdrawals remaining for the month.

In the preferred embodiment, the maximum amount limit is equal to the maximum amount of funds protected under F.D.I.C. and F.S.L.I.C., currently $100,000. Further, the maximum number of withdrawals is equal to the maximum number of withdrawals allowed for money market savings accounts, currently six.

As a result, an extended coverage monetary regulation system is provided that removes concerns individual and institutions have about exceeding deposit insurance limits, and that automatically distributes customer deposits to multiple selected financial institutions so as to obtain F.D.I.C. or F.S.L.I.C. coverage for the full amount regardless of the amount of the depositors deposit, i.e. no maximum limit. Further, the system provides the customer immediate access to funds and unlimited F.D.I.C. or F.S.L.I.C. coverage through a single managing institution or central transaction control center.

BRIEF DESCRIPTION OF THE DRAWINGS

Other objects, features and advantages of the present invention will become more fully apparent from the following detailed description of the preferred embodiment, the appended claims, and the accompanying drawings in which:

FIG. 1 is a schematic diagram illustrating a preferred embodiment of the extended coverage monetary regulation method of the present invention in three interrelated figures;

DETAILED DESCRIPTION OF THE PREFERRED EMBODIMENT

Figure 1A:
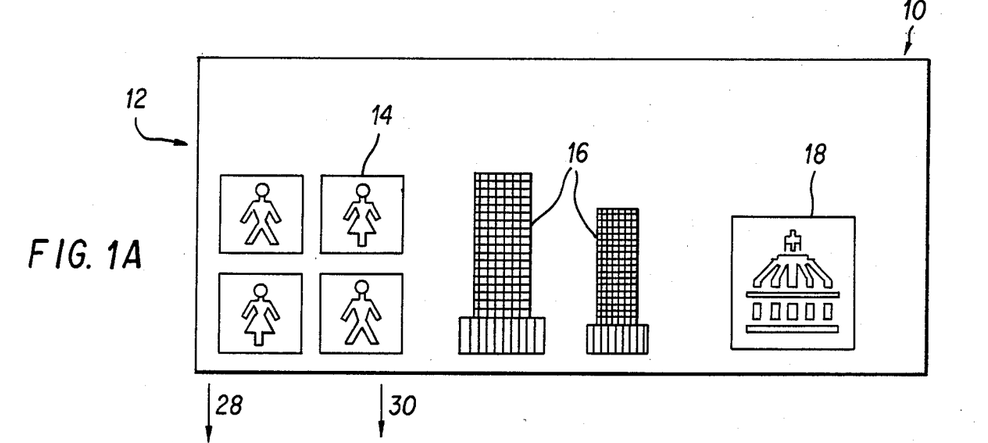
FIG. 1a illustrates the variety of depositors provided access by means of the method of this invention.

The preferred embodiment of the present invention is illustrated by way of example in FIG. 1. With specific reference to FIG. 1a, extended coverage monetary regulation method 10 includes depositors 12 comprised of individuals 14, businesses 16, and governments or public institutions 18. These depositors 12 require that all their funds, in whatever amounts, are fully insured by a federal agency, F.D.I.C. or F.S.L.I.C., that these funds earn a current money market rate and that the funds that are deposited are available for immediate withdrawal. Additionally, these depositors want to deal with one single financial institution.

Figure 1B:
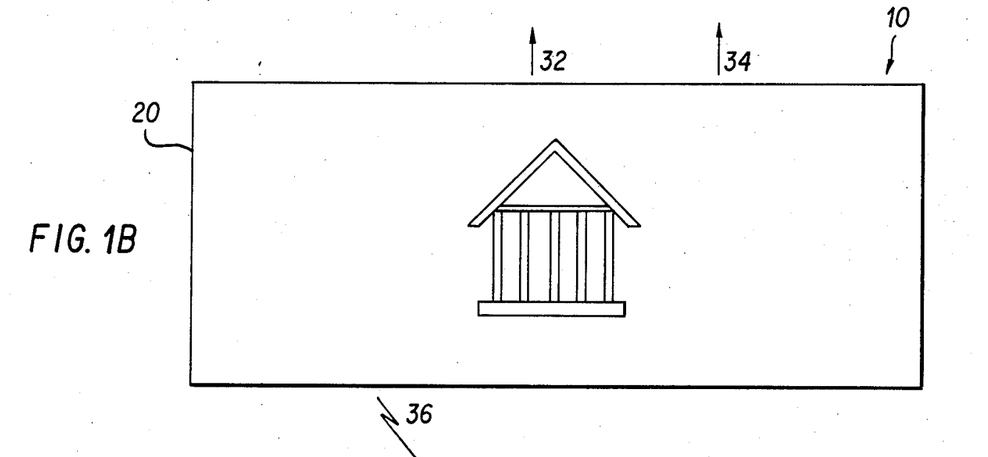
FIG. 1b is an illustration of the managing financial institution, central transaction control center, with arrows between FIG. 1a and 1b indicating the flow of funds and information from the depositors to the central transaction control center and vice versa.

With reference to FIG. 1b, the managing financial institution or central transaction control center 20 signs a formal agency agreement with depositors 12. Depositors 12 deliver funds to central transaction control center 20 for deposit into federal insured time deposits. Central transaction control center 20 records details of the agency relationship with depositors 12 on a specialized microcomputer data base system. The specialized microcomputer system calculates the insurance requirements of each depositor 12 and selects one or more of the federally insured financial depository institutions 22, shown in FIG. 1c, as the deposit location appropriate for the depositor's funds. The federally insured financial institutions 22 can be either F.D.I.C. insured banks 24 or F.S.L.I.C. insured savings and loans 26, or a combination of both.

Figure 1C:
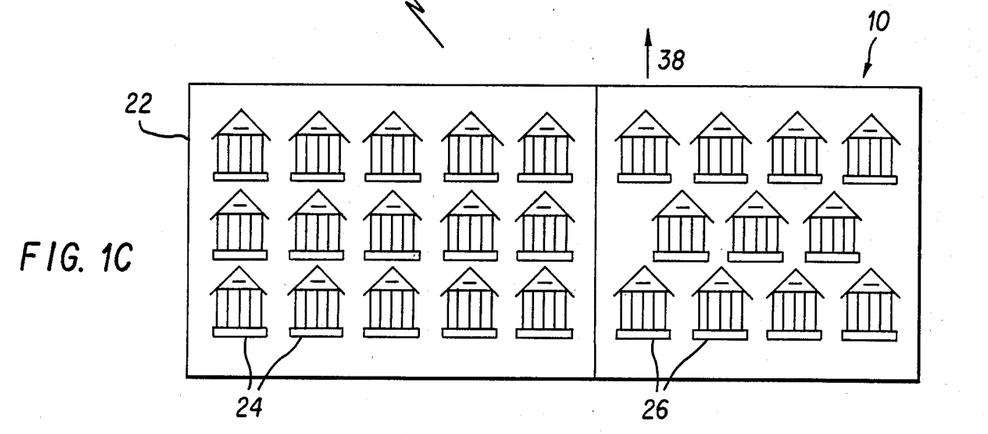
FIG. 1c is an illustration of selected federally insured depositories and the arrow and electric transmission signal indicate the types of information received and processed between the central transaction control center and the selected depositories.

Managing financial institution 20 establishes a single money market savings account at each of the selected federally insured financial institutions 22 to receive co-mingled deposits of multiple depositors 12. The managing financial institution 20 records details of the account established at selected federally insured financial institutions 22 on the microcomputer data base system. The microcomputer data base system of the present invention is any one of the several types known in the art and commercially available and is not disclosed further herein.

After depositors 12 sign a formal agency agreement with managing financial institution 20, depositors 12 deliver funds to managing financial institution 20 for deposit into federally insured time deposits located at federally insured financial institutions 22. The managing financial institution 20 records transactions of the agency relationship with depositors 12 on a main computer and on the microcomputer system as well. These two computers compare information daily so as to verify data entered and a control report is produced that ensures accuracy of account data. The microcomputer also creates electronic transaction entries that are used to deposit funds in the selected federally insured depositories 22 by use of the Automated Clearing House (A.C.H.) system operated by the federal reserve bank. Another control feature is that all depositors 12 must make withdrawal requests to the managing financial institution 20 only.

In operation then, depositors 12 provide managing financial institution 20 with an agency agreement 28 and deposits 30. Managing financial institution 20 maintains depositor's records, federally insured depository 22 records, transaction records, records of deposits retained in federally insured financial institution depository 22 accounts up to insured limits, management reports, federally required IRS tax reports, calculates required insurance limits and allocates and distributes depositor's 12 deposits 30 in appropriate federally insured financial institution depositories 22.

Further, managing financial institution 20 provides depositors 12 with withdrawals 32 as needed with no limits on the number of withdrawals. Additionally, managing financial institution 20 provides depositors with statements and a listing of institutions 22 selected to hold deposits 30, interest paid to depositors 12 and collected from depositories 22. These account statements and insurance listings 34 are provided on a regular basis.

Figure 2:
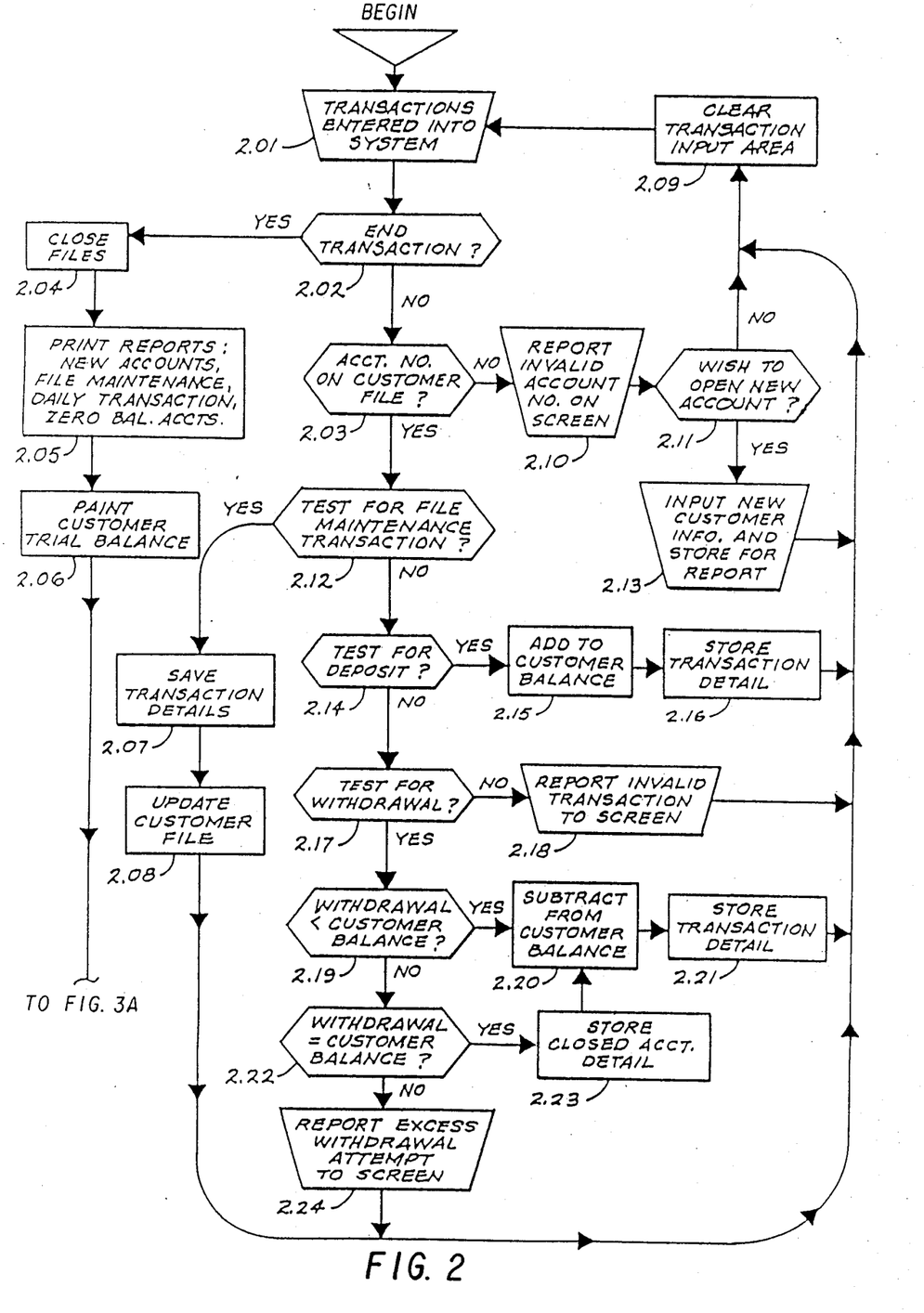
FIG. 2 is a flow chart depicting customer transaction processing.

By way of amplification, reference is now made to FIG. 2, Customer Transaction Processing. FIG. 2 is a flow chart depicting the above described process of maintaining detailed records and printing detailed reports pertaining to (1) each customer depositing funds into an insured savings agency account; i.e., account number, name, address, tax identification number, account type, etc., and (2) cash deposit and withdrawal transactions that establish an account balance that must be fully insured.

By way of further amplification and example, transactions pertaining to any customer account are entered through a data terminal (block 2.01) in any order as desired. Test 2.02 determines whether the current transaction is an "End of Input" transaction or not. If "NO" response is indicated, test 2.03 is performed to determine if the account number of the entered transaction matches the account number of a customer account on file. If a "NO" response is indicated, the attempt to process a transaction on a nonexistent account is reported to the screen of the terminal (block 2.10) and the terminal operator is asked if a new account is to be established (test 2.11). If the terminal operator responds "YES", detailed information describing the new customer account, including an account number, is entered by the terminal operator (block 2.13), detail information is stored for a new account report (block 2.13) to be produced at block 2.05, the transaction input area is cleared (block 2.09), and the terminal operator is given the opportunity to enter another transaction (block 2.01). If the terminal operator indicates that no new account should be established (response to test 2.11), the transaction input area is cleared (block 2.90) and the terminal operator is given the opportunity to enter another transaction (block 2.01).

If test 2.03 matches a customer account on file to the number of the transaction being presented for processing ("YES" response), test 2.12 then compares the code number of the current transaction to determine if the transaction is a file "maintenance" transaction. If the indication is "YES", block 2.07 stores detail of the information being changed, along with the "new" information that will replace it, for a report to be created at block 2.05. Next, the customer file is updated with the new information provided by the transaction detail (block 2.08) and the next transaction is requested (blocks 2.09 and 2.01).

If the indication of test 2.12 is "NO" (not a maintenance transaction), then test 2.14 compares the transaction code of the current transaction to determine if it is a "deposit". If the indication is "YES", the amount of the transaction is added to the customer balance (block 2.15), and transaction detail information (account number, date, code, amount) is stored (block 2.16) for a report to be created at block 2.05. The next transaction is then requested (block 2.09 and 2.01).

If the indication of test 2.14 is "NO" (not a deposit), then test 2.17 compares the transaction code of the current transaction to determine if it is a "withdrawal". If the indication is "NO", the attempt to process an unauthorized transaction type is reported to the terminal screen (block 2.18) and the next transaction is requested (blocks 2.09 and 2.01).

If test 2.17 indicates a withdrawal transaction ("YES"), test 2.19 compares the amount of the withdrawal transaction to determine if it is less than ($<$) the customer account balance. If the indication is "YES", the withdrawal transaction amount is subtracted from the customer balance (block 2.20), and transaction detail information (account number, date, code, amount) is stored (block 2.21) for a report to be created at block 2.05. If test 2.19 indicates that the withdrawal amount is not less than the customer account balance ("NO"), test 2.22 compares the withdrawal transaction amount to determine if it is equal ($=$) to the customer account balance. If the indication is "YES", detail information of the closed or zero balance account is saved (block 2.23) to be reported at block 2.05. Then, the transaction is processed as a normal withdrawal through blocks 2.20, 2.21, 2.09, and 2.01.

If test 2.22 indicates "NO", the withdrawal amount is greater than the customer account balance and the excess withdrawal attempt is reported to the terminal screen (block 2.24) and then another transaction is requested through blocks 2.09 and 2.01.

When the terminal operator enters an "End of Input" transaction, test 2.02 will signal the need to finalize processing with a "YES" indication. All files are closed (block 2.04), reports (New Accounts, File Maintenance, Daily Transactions, and Zero Balance/Closed Accounts) are printed (block 2.05), and a Customer Trial Balance Listing of all accounts reflecting their current balances is printed (block 2.06).

Figure 3A:
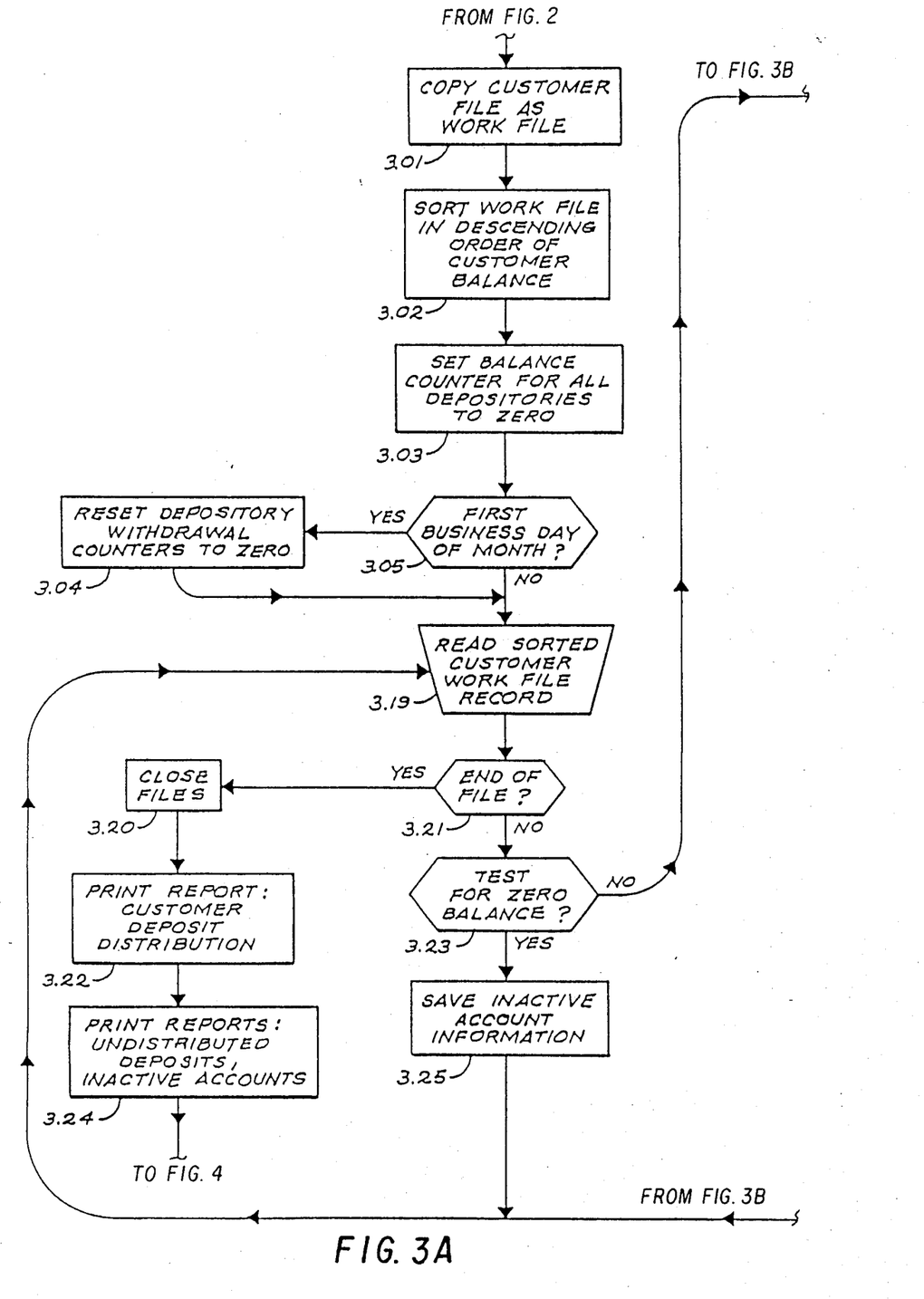
FIGS. 3a and 3b are respectively the upper and lower portions of a schematic flow chart depicting the deposit distribution system.
Figure 3B:
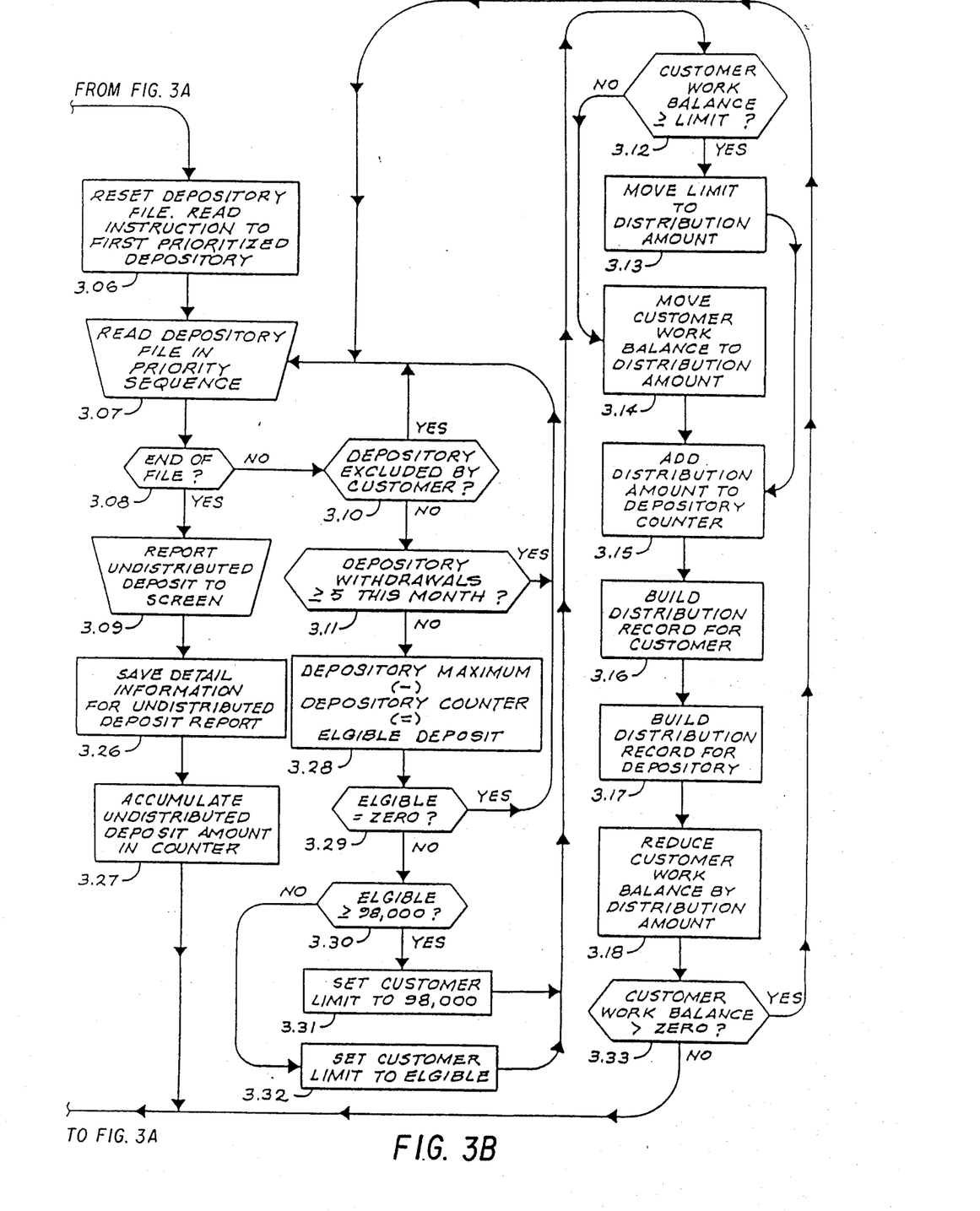
Figure 4:
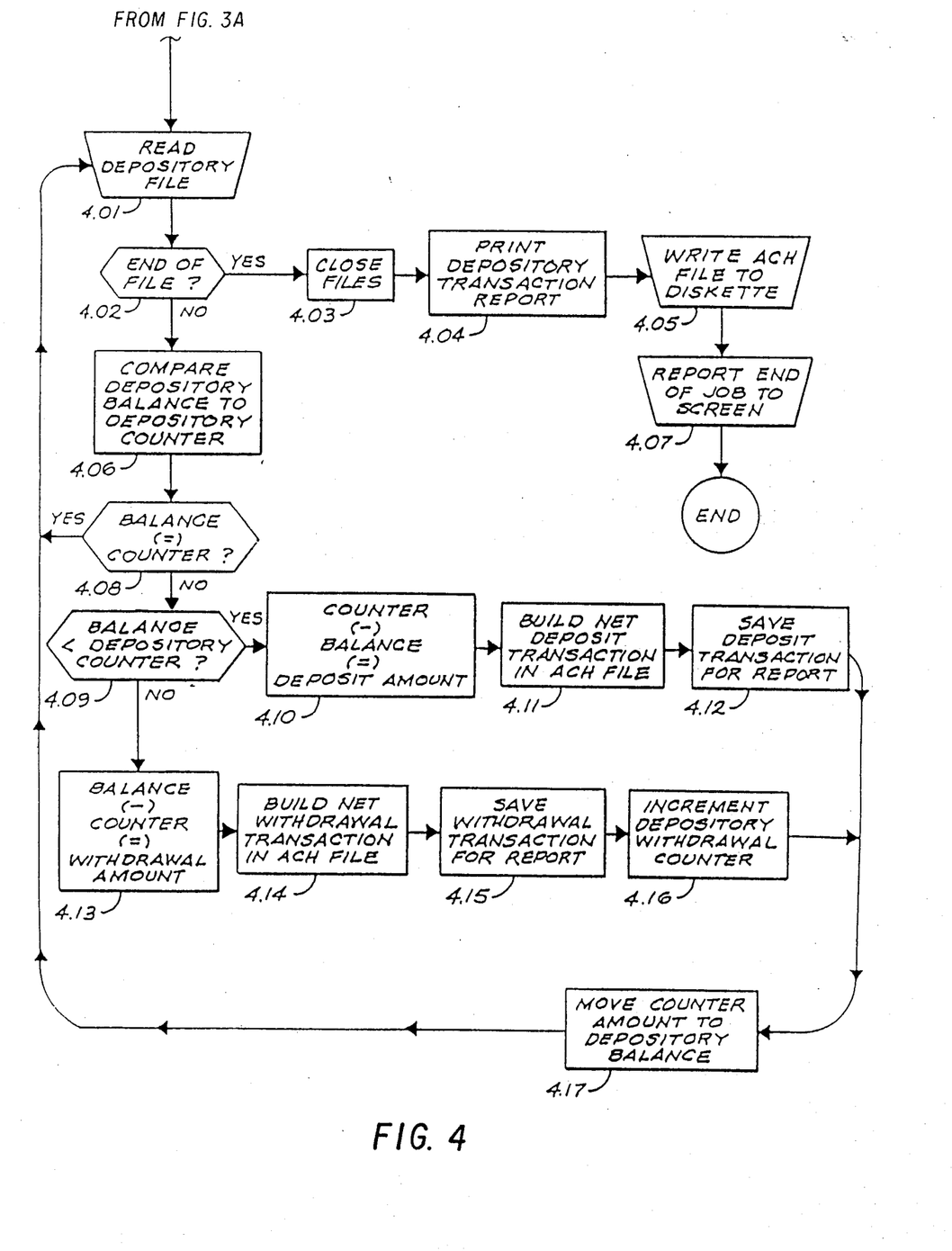
FIG. 4 is a flow chart illustrating the bank settlement entry system.

Processing is next transferred to the Deposit Distribution System, FIGS. 3 and 4.

The managing financial institution, central transaction control center, 20 by means of Automatic Clearing House system electronically handles A.C.H. transactions 36, including deposits 20, withdrawals 32, and interest collections from depositories 22. Federally insured depositories 22 provide managing financial institution 20 a single statement 38 of co-mingled money market savings accounts maintained for managing financial institution 20. The federally insured depositories 22 have no knowledge of the identity of individuals 14, businesses 16, or government 18 depositors 12 and treat the deposits as a single money market account.

By way of example, if individual 14 has $200,000 he wished to insure with managing financial institution 20, institution 20 could set up one account, as known in the art, for the individual and one for his spouse and the money could be insured at the financial institution 20 without transfer to depositories 22. If, however, individual 14 was already insured to the maximum amount at managing financial institution 20, institution 20 could still receive the $200,000 from individual 14 and guarantee federal insurance, through utilization of the system of this invention, by selecting federally insured depositories 22 that were not excluded by the depositor in the agency agreement 28. The individual depositor could also, by means of agency agreement 28, choose not to use either F.D.I.C. insured banks 24 or F.S.L.I.C. insured savings and loans 26. Once the agreement 28 was made, and the $200,000 deposited with managing financial institution 20, financial institution 20 selects two federally insured depositories 22, either F.D.I.C. insured banks 24 or F.S.L.I.C. insured savings and loan 26 or a combination of both, if agreement 28 allows, and, by means of A.C.H. transaction 36, deposits the money in two separate accounts. The managing financial institution 20 makes a record of where the money has been deposited and two depositories 22 have $100,000 in their co-mingled account for financial institution 20. Should depositor individual 14 desire to add more sums in his insured account, he could do so and managing financial institution 20 would select another federally insured depositor 22 to handle the additional sum. Because managing financial institution 20 has a record of the individuals 14 and their amounts deposited, federally insured depositories 22 can maintain in one account sums vastly in excess of $100,000.

Further, the microcomputer system monitors the number of withdrawals that have been made from each of the money market savings accounts maintained at the federally insured financial institutions 22 and automatically prevents the number from exceeding the regulatory limit of six (6) per month. When the withdrawals reach one less than the regulatory limit, that is five, the computer makes one last A.C.H. transaction 36 and withdraws the entire amount from the federally insured depository 22 and deposits it into another depository 22 that has four or fewer withdrawals made that month. As a result, the depositors 12, individuals 14, businesses 16, and governments 18, and have unlimited number of withdrawals while placing the burden on the managing financial institution 20 to ensure that their funds are immediately accessible as described above.

FIGS. 3a, 3b and 4 further amplify the above described system by way of a flow chart example. FIGS. 3A and 3B are a flow chart depicting the above described process used (1) to determine the portion of each customer's account balance that should be deposited to specific depository institutions (excluding institutions so specified by the customer, or those that have reached a predetermined maximum deposit level from customer deposits, or have experienced a number of monthly withdrawal transactions that would disqualify use of the account due to withdrawal transaction limitations established by regulations) in order to keep each customer's deposit at any single institution to an amount less than the current F.D.I.C. insurance limit, (2) to determine the cumulative balance required in the commingled deposit account at each depository institution to equal the sum of customer deposit amounts as calculated, and (3) to produce data files and printed reports reflecting the distribution of each customer's deposits by institution and the specific customer deposits that contribute to the calculation of each bank's commingled account balance.

To begin with, a copy is made of the customer file (block 3.01) created as a result of customer transaction processing (see, FIG. 2). The customer work file is then sorted (block 3.02) in descending order of each customer's total agency account balance in order to process the largest balance accounts first so, for example, that depositories with total balance limitations will be available for customers with a need for the largest number of depository institutions to satisfy their insurance needs. A balance accumulator/counter for each depository is set to zero (block 3.03). Test 3.05 determines if the current processing date is the first business day of the calendar month. If a "YES" response is indicated, the month-to-date withdrawal counter for each depository is set to zero (block 3.04 before reading the sorted customer work file (block 3.19). If a "NO" response is indicated by test 3.05, processing proceeds directly to reading the sorted customer work file (block 3.19).

The customer work file is read (block 3.19) to obtain the next customer record in descending account balance sequence. Test 3.21 determines if the "end of file" has been reached. If a response of "NO" is indicated, test 3.23 determines if the customer balance is zero. If a "YES" response is indicated, information about the inactive account is stored (block 3.25) and the next customer record is read at block 3.19.

If a "NO" response is indicated by test 3.23 (not an inactive account), the depository file read instruction (block 3.07) is set to the beginning of the depository file based upon pre-established priority codes that allow selection of the order in which depositories are considered for customer deposits. Next, a depository record is read from the depository file in priority order (block 3.07). Test 3.08 determines if the "end of file" has been reached. If a "YES" response is indicated, the fact that a customer account balance cannot be completely distributed is reported to the terminal screen (block 3.09), details of the account are stored for reporting (block 3.26), and the amount of the undistributed deposit is accumulated (block 3.27) before reading the next customer record at block 3.19.

If a "NO" response is indicated by test 3.08 (not end of depository file), test 3.10 determines if the depository has been specifically excluded by the customer being processed. If a "YES" response is indicated, the next depository record is read at block 3.07.

If a "NO" response is indicated by test 3.08 (not an excluded institution), test 3.11 determines if the month-to-date withdrawal counter for this depository is equal to or greater than one less than the maximum number of withdrawals allowed by regulations for money market savings accounts. The flow chart assumes the maximum allowable number of withdrawal transactions monthly is six (6), as previously discussed, and therefore test 3.11 is shown as determining is the number of month-to-date withdrawals is five (5) or more. If a "YES" response is indicated, the next depository record is read at block 3.07.

If a "NO" response is indicated by test 3.11 (not excessive withdrawals), the amount of customer deposits that the depository is eligible to receive within a predetermined maximum depository deposit limit is calculated (block 3.28) by subtracting the amount of today's depository accumulator/counter from the predetermined depository maximum. Test 3.29 next determines if the eligible amount calculated is "zero". If a "YES" response is indicated, the next depository record is read at block 3.07.

If a "NO" response is indicated by test 3.29 (eligible amount not zero), test 3.30 determines if the eligible amount is equal to or greater than a predetermined amount that is less than the F.D.I.C. insurance limit. The chart assumes that the current F.D.I.C. insurance limit is $100,000 and uses the amount less than the limit of $98,000. If the eligible amount is equal to or greater than $98,000 ("Yes" response), then the customer limit for this depository is established at $98,000 (block 3.31) and test 3.12 is performed. If a "NO" response is indicated by test 3.30, then the customer limit for this depository is established as the eligible amount (block 3.32) and test 3.12 is performed.

Test 3.12 determines if the customer balance on the work file is equal to or greater than the customer limit for this depository that was established as a result of test 3.30. If a "YES" response is indicated, the customer limit amount is established as the distribution amount for this depository (block 3.13) and processing proceeds to block 3.15. If a "NO" response is given to test 3.12, the customer work balance is established as the distribution amount for this depository and processing proceeds to block 3.15.

At block 3.15, the distribution amount established as a result of test 3.12 is added to the depository accumulator/counter. Next, detailed information about the distribution (date, customer number, customer name, depository number, depository name, and distribution amount) is saved for later reporting of (1) deposits for each customer by depository (block 3.16) and (2) deposits at each depository by customer (block 3.17). Then, the customer work balance is reduced by the distribution amount (block 3.18).

Test 3.33 determines if the customer work balance that remains to be distributed (as calculated at block 3.18) is greater than zero. If the indicated result is "YES", the next depository file is read (block 3.07) and the distribution process continues. If a "NO" response is indicated to test 3.33 (zero customer work balance), all of this customer's deposit balance has been accounted for in the appropriate depository accumulators/counters and the next customer record is read at block 3.19.

When test 3.21 indicates that the "end of file" has been reached ("YES" response) on the sorted customer work file (all customer deposit balances have been processed), all files are closed (block 3.20). Next, customer deposit distribution reports are printed by customer and by depository (block 3.22) and reports of undistributed deposits and of inactive accounts are printed (block 3.24).

Processing is next transferred to the Bank Settlement Entry System, FIG. 4.

Once again, by way of amplification of the above described system, FIG. 4 is a flow chart depicting the process used to (1) calculate any net deposit or withdrawal amount required at each depository to adjust the depository balance to the level determined necessary in FIGS. 3A and 3B to fully insure the deposits of all customers, (2) prepare a magnetic file containing net deposit and withdrawal transactions for depository commingled accounts suitable for entry into the Automated Clearing House (ACH) network operated by the Federal Reserve System, and (3) prepare a detailed printed report of the depository transactions generated by the system.

The depository file is read (block 4.01) and test 4.02 determines if the "end of file" has been reached. If the indication is "NO", the depository balance from the current file is compared to the depository accumulator/counter amount for the same depository as calculated at block 3.15 of FIG. 3 (block 4.06). Test 4.08 determines if the depository balance and the depository accumulator/counter are equal. If the indication is "YES" (equal), no change is required in the depository balance and the next depository record is read at block 4.01. If the result of test 4.08 is "NO" (unequal), then test 4.09 determines if the depository balance is an amount less than the depository accumulator/counter.

If the result of test 4.09 indicates that the depository balance is less than the depository accumulator/counter ("YES"), then the depository balance is subtracted from the depository accumulator/counter (block 4.10) to determine the amount of a deposit necessary to bring the depository balance equal to the depository accumulator/counter amount which is required to exactly insure customers with deposit amounts in this institution. Next, a deposit transaction record is built (including date, amount, deposit code, depository routing transit number, and depository account number) and stored in an ACH file (block 4.11). Details of the deposit transaction (date, depository name, deposit code, transaction amount) are saved for later preparation of a depository transaction report (block 4.12). Next, the depository accumulator/counter amount is moved to replace the depository balance amount (block 4.17) and establish the new depository balance that will result from the deposit transaction that was just created (block 4.11); then the next depository record is read at block 4.01.

If the result of test 4.09 indicates that the depository balance is greater than the depository accumulator/counter ("NO"), then the depository accumulator/counter amount is subtracted from the depository balance amount (block 4.13) to determine the amount of withdrawal necessary to being the depository balance equal to the depository accumulator/counter amount which is required to exactly insure customers with deposit amounts in this institution. Next, a withdrawal transaction record is built (including date, amount, withdrawal code, depository routing transit number, and depository account number) and stored in an ACH file (block 4.14). Details of the withdrawal transaction (date, depository name, withdrawal code, transaction amount) are saved for later preparation of each depository transaction report (block 4.15). Next, the month-to-date depository withdrawal counter is incremented by one (1) and the new total is stored in the depository file (block 4.16). Then, the depository accumulator/counter amount is moved to replace the depository balance amount (block 4.17) and establish the new depository balance that will result from the withdrawal transaction that was just created (block 4.14); then the next depository record is read at block 4.01.

If the result of test 4.02 is "YES" ("end of file"), then all files are closed (block 4.03). Next, a depository transaction report is printed (block 4.04) that reports all deposits and withdrawals prepared as a result of the current day's activity and provides total amounts for balancing purposes. Then, the complete ACH transaction file (containing deposit and withdrawal transactions for depository institutions) is written to a magnetic diskette (block 4.05) for later delivery to an authorized ACH originating institution to allow entry of the transactions created into the collection system operated by the Federal Reserve Bank. Finally, an "end of job" status is reported to the terminal screen (block 4.07) to signal the end of the bank settlement entry system for this business day.

It is important to note that F.D.I.C. regulations provide that funds of multiple depositors may be co-mingled in a deposit account with each depositor entitled to a full $100,000 insurance protection if (1) a formal agency agreement is in effect, and (2) the agent maintains detailed records of each depositors interest in the co-mingled deposit in the normal course of business. Co-mingling of deposits 30 of multiple depositors 12 allows the maintenance of only one depository account at each selected depository 22, which reduces significantly the burden of reconciling the records of managing financial institution 20 with those of the depositories 22. It also keeps the identity of the depositor 12 confidential.

The present invention makes use of a money market savings account at federally insured depositories 22 because it allows additions and deductions from the account without the necessity of opening and closing accounts for each depositor transaction. Further, the single commingled deposit account at each federally insured financial institution 22 can easily be reconciled to the depositories account records monthly. While federal regulations require that institutions reserve the right to require seven days notice before withdrawals are made and this reservation is set forth in agency agreement 28, generally this right is not exercised. Importantly, therefore, the depositor 12 can be allowed immediate access to deposited funds by means of the above described method of managing the number of withdrawals for each money market savings account at a selected federally insured depository 22 to prevent exceeding the maximum of six withdrawals allowed monthly by A.C.H. transaction 36. Thus, the extended coverage monetary regulation system of the present invention provides depositors with an unlimited amount of F.D.I.C. or F.S.L.I.C. coverage regardless of the amounts deposited at a single institution while providing immediate access to funds without the normal money market withdrawal limits.

While the present invention has been disclosed in connection with the preferred embodiment thereof, it should be understood that there may be other embodiments which fall within the spirit and scope of the invention as defined by the following claims.

What is claimed is:

1. An extended coverage monetary regulation system comprising:
   A. a central transaction control center for receipt, disbursement, and insurance of a plurality of individual account funds in unlimited amounts;
   B. an individual account fund processing means for processing funds in commingled form so that a plurality of insured financial institutions receive portions of said commingled individual account funds and so that each financial institution receives less than a maximum amount of each said individual account funds;
   C. means for monitoring each of said individual account funds so that upon receipt of a deposit at said central control center, a deposit is received by said financial institution that, after said deposit, maintains less than a maximum amount of said individual account funds; and D. means for monitoring each of said financial institutions so that as a total number of withdrawals from each of said financial institutions commingled individual account funds reaches one less than a maximum number, one final withdrawal is made reducing a balance of said individual account funds to zero and transferring said balance to financial institutions with more than one less than a maximum number of withdrawals available.

2. The system according to claim 1 wherein said central transaction control center further comprises means for receipt, disbursement and insurance of said individual accounts from individuals, businesses and governmental entities, and means for disbursing funds from said accounts only to agreed upon financial institutions while providing daily monitoring of balances in said financial institutions, monthly accounting of funds deposited and withdrawn and interest earned, and annual tax reporting.

3. The system according to claim 2 wherein said means for monitoring individual accounts ensures that said maximum amount is equal to the maximum amount of funds protected under one of the following insurance vehicles: Federal Deposit Insurance Corporation and Federal Savings and Loan Insurance Corporation.

4. The system according to claim 3 further including means for ensuring that said plurality of financial institutions are prohibited from receiving information concerning the identity and amounts of said individual account funds received in commingled form so that said financial institutions deal with one fluctuating lump sum only.

5. The system according to claim 1 wherein said financial institutions are F.D.I.C. insured banks.

6. The system according to claim 1 wherein said financial institutions are F.S.L.I.C. insured savings and loans.

7. The system according to claim 1 wherein said financial institutions are a combination of F.D.I.C. insured banks and F.S.L.I.C. insured savings and loans.

8. The system according to claim 1 wherein said means for monitoring said financial institutions ensures that said maximum number of withdrawals is equal to the maximum number of withdrawals allowed for money market savings accounts.

9. An extended coverage monetary regulation system comprising:
A. a central transaction control center for receipt, disbursement, and insurance of a plurality of individual account funds in unlimited amounts;
B. means for receiving individual account funds from individuals, business, and governmental entities and for disbursing funds from said accounts only to agreed upon financial institutions while providing daily monitoring of balances in said financial institutions, monthly accounting of funds deposited and withdrawn and interest earned, and annual tax reporting;
C. processing means for processing said individual account funds in commingled form so that a plurality of insured financial institutions receive portions of said commingled individual account funds and so that each financial institution receives less than a maximum amount of each of said individual account funds;
D. means for ensuring that said plurality of financial institutions are prohibited from receiving information concerning the identity and amounts of said individual account funds received in commingled form so that said financial institutions deal with one fluctuating lump sum only;
E. means for monitoring each of said individual account funds so that upon receipt of a deposit at said central control center, a deposit is received by said financial institution that, after said deposit, maintains less than a maximum amount of said individual account funds; and
F. means for monitoring each of said financial institutions so that as a total number of withdrawals from each of said financial institutions commingled individual account funds reaches one less than a maximum number, one final withdrawal is made reducing a balance of said individual account funds to zero and transferring said balance to financial institutions with more than one less than a maximum number of withdrawals available.

10. The system according to claim 9 wherein said means for monitoring individual accounts ensures that said maximum amount is equal to the maximum amount of funds protected under one of the following insurance vehicles: Federal Deposit Insurance Corporation and Federal Savings and Loan Insurance Corporation.

11. The system according to claim 9 wherein said financial institutions are F.D.I.C. insured banks.

12. The system according to claim 9 wherein said financial institutions are F.S.L.I.C. insured savings and loans.

13. The system according to claim 9 wherein said financial institutions are a combination of F.D.I.C. insured banks and F.S.L.I.C. insured savings and loans.

14. The system according to claim 9 wherein said maximum number of withdrawals is equal to the maximum number of withdrawal allowed for money market savings accounts.

* * * * *